United States Patent

Schrepferman

[11] 4,011,785
[45] Mar. 15, 1977

[54] NAIL AND POWERED NAILER

[75] Inventor: John R. Schrepferman, Merriam, Kans.

[73] Assignee: Bliss & Laughlin Ind., Inc., Oak Brook, Ill.

[22] Filed: Apr. 18, 1973

[21] Appl. No.: 352,243

Related U.S. Application Data

[63] Continuation-in-part of Ser. No. 153,756, June 16, 1971, abandoned.

[52] U.S. Cl. .................................. 85/10 R; 85/20; 85/28; 29/432; 51/320; 206/343; 227/130
[51] Int. Cl.² ........................................ F16B 15/00
[58] Field of Search ............... 85/10 R, 21, 20, 44, 85/28; 51/319, 320, 308

[56] References Cited
UNITED STATES PATENTS

| | | | |
|---|---|---|---|
| 1,697,810 | 1/1929 | Comstock | 85/10 R |
| 1,912,099 | 5/1933 | Rosenberg | 85/44 |
| 2,248,530 | 7/1941 | Granger | 51/320 |
| 3,294,303 | 12/1966 | Anstett | 85/17 |

Primary Examiner—Ramon S. Britts
Attorney, Agent, or Firm—Watson D. Harbaugh

[57] ABSTRACT

A pallet size nail having a comparatively small gauge shank whose surface is pitted with contiguous minute pits bounded by small sharply shaped wall convexities as provided by grit blasting the surface with approximately 80 mesh grit of aluminum oxide, which protuberances imbed in wood fibers and provide a substantial increase in holding power against withdrawal compared with sandblasted nail shanks, the nail preferably being spirally fluted.

5 Claims, 29 Drawing Figures

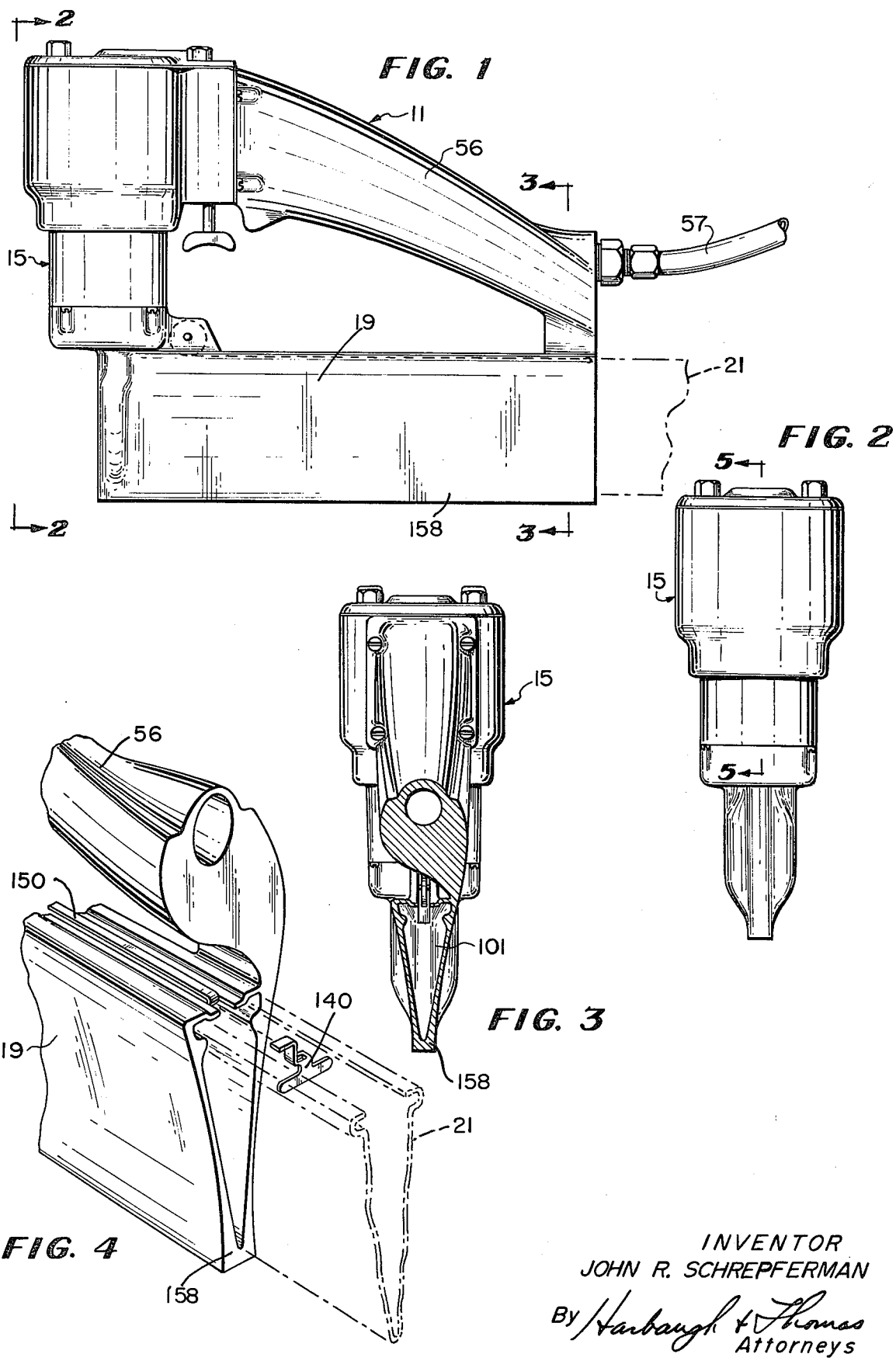

INVENTOR:
JOHN R. SCHREPFERMAN

By Harbaugh & Thomas
Attorneys

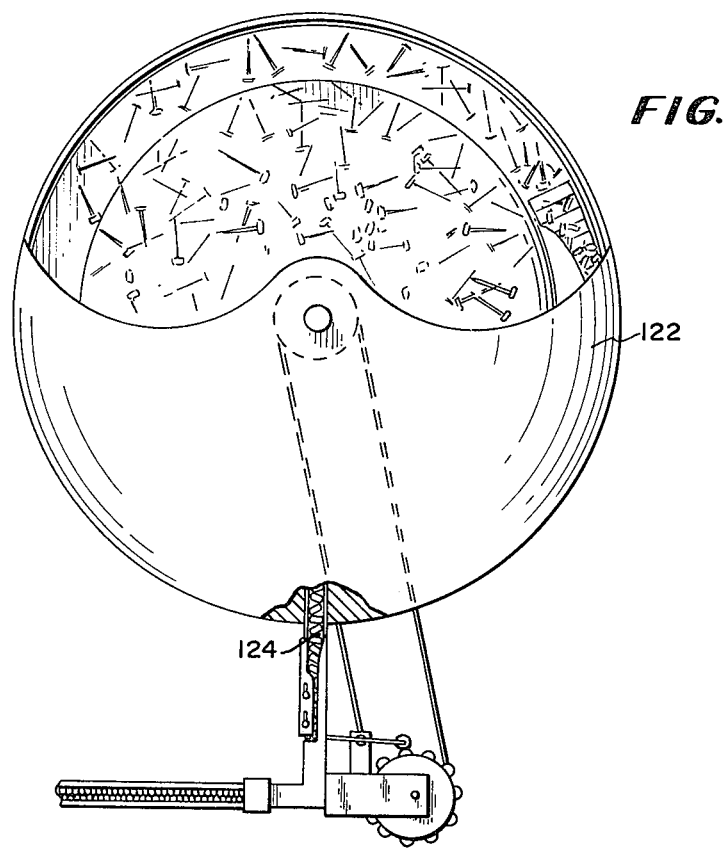
FIG. 7
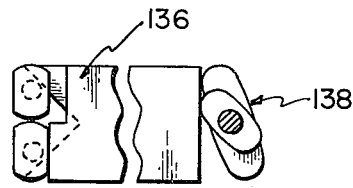
FIG. 9
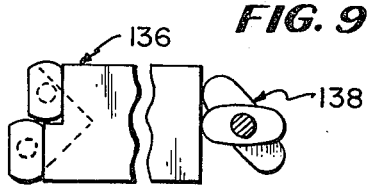
FIG. 10
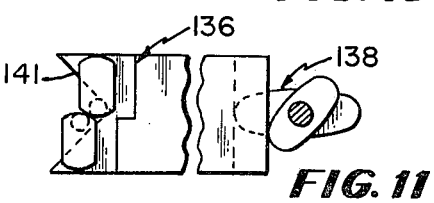
FIG. 11
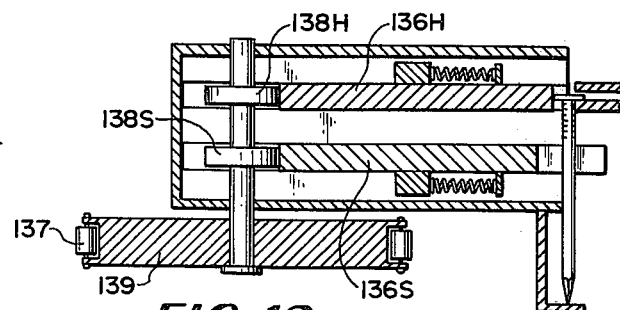
FIG. 12
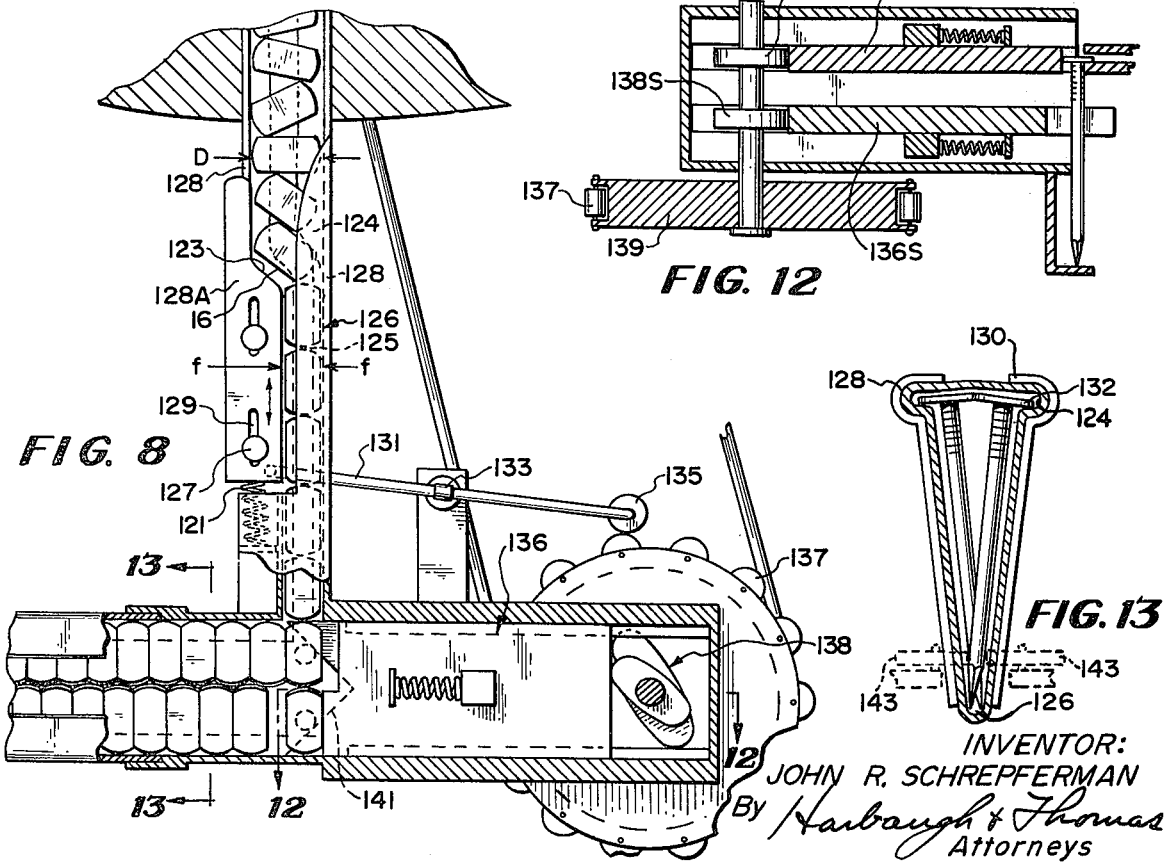
FIG. 8
FIG. 13
INVENTOR:
JOHN R. SCHREPFERMAN
By Harbaugh & Thomas
Attorneys

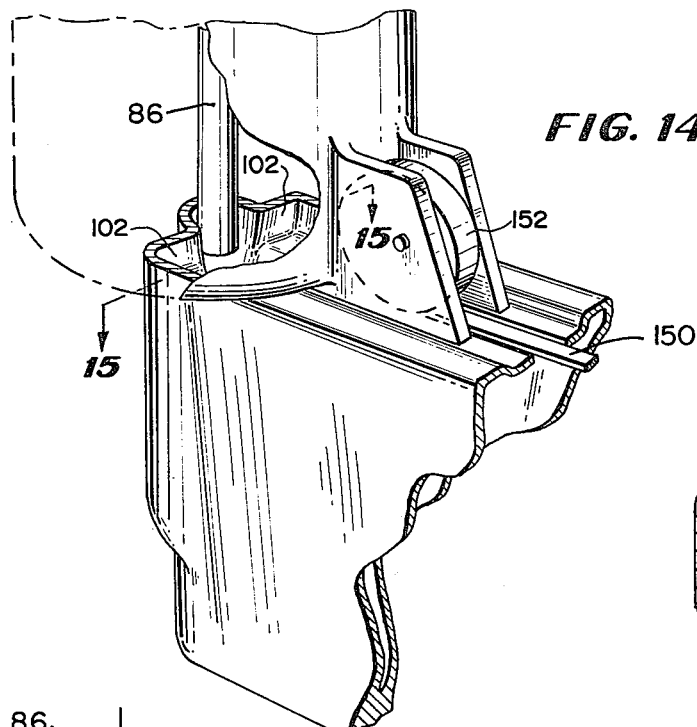
FIG. 14
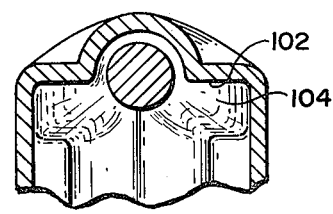
FIG. 15
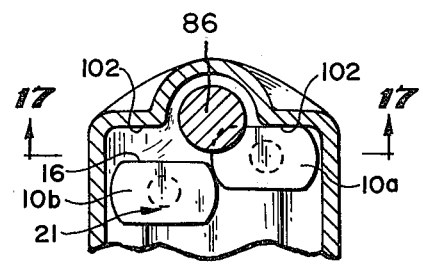
FIG. 16
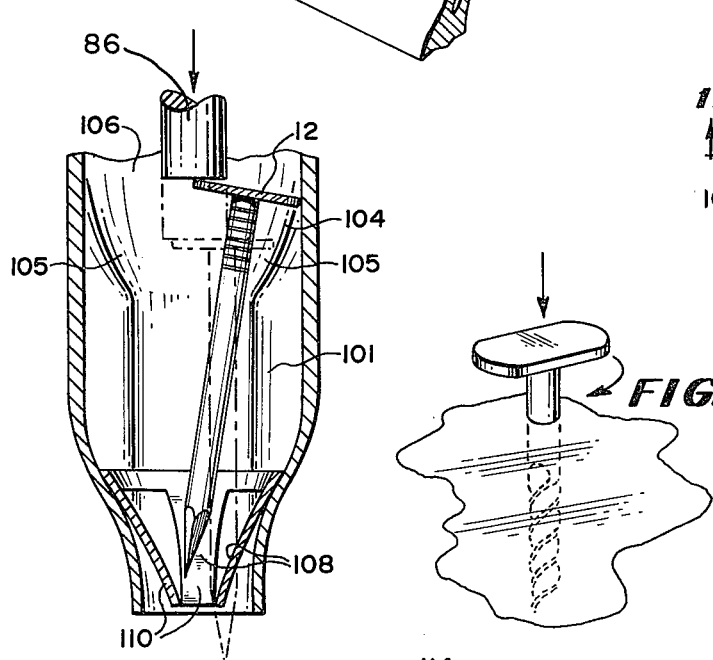
FIG. 17
FIG. 18
FIG. 19
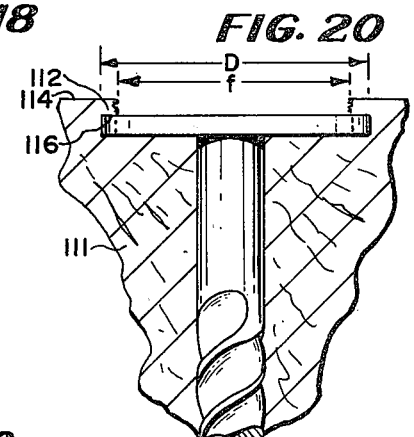
FIG. 20
INVENTOR:
JOHN R. SCHREPFERMAN
By Harbaugh & Thomas
Attorneys

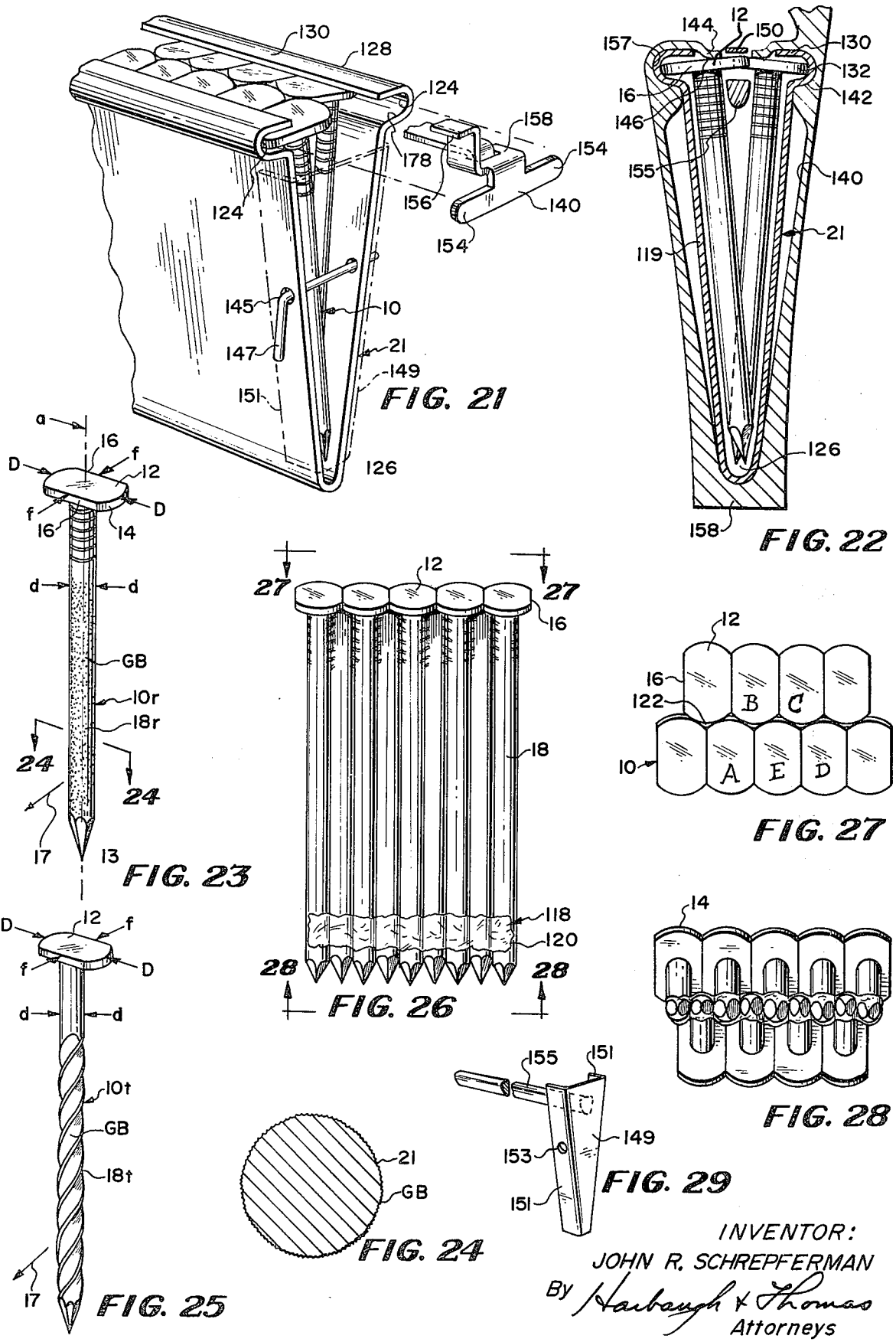

NAIL AND POWERED NAILER

RELATED APPLICATION

This application is a continuation-in-part of application Ser. No. 153,756, filed June 16, 1971, now abandoned.

BACKGROUND OF THE INVENTION

Powered nail drivers utilizing nail feed clips and pneumatic feed tubes are old in the art for feeding a high volume of nails classified as common nails, as where the diameter of circular flat heads are generally more than twice the diameter of the shanks. In feeding such conventional nails progressively to a powered driver, the heads of the nails either are coplanar and spaced, or are disposed edge-to-edge in a transport train, or are axially offset enough to overlap vertically with the head of the lead nail contacting the adjacent shank on the next nail head above it. In most cases, however, unless supported in an inclined clip member the nails are carried on a feed tape means or a frangible adhesive that supports the nails as a stick unit.

In feeding a train of nail heads in edge-to-edge contact by a resilient force under working conditions, the contacting edges of the heads can become overlapped and cause malfunctions because there is only a critical single point of contact between adjacent nails whose nail head edges are rounded in two directions. In feeding overlapping heads there are theoretically two contact points, but they are critically and contiguously arranged at one end of the nails.

The feeding can be done by gravity, if the nails are loose, or by mechanical means engaging the nail heads and shanks at the level of the contact points to provide clip-forming supports such as adhesive tape or frangible mastics, etc. Moreover, a lot of available clip storage space for nails is not utilized because of the wide spaces between the nail shanks. The spacing is at least the radial distance of the head overhanging the shank.

Where a supporting means for spaced shanks is used, waste material has to be disposed of as the lead nail is stripped free each time for driving, and, although heads have been provided having the same width as the nail shank, the holding power of the reduced head area is greatly reduced to a fraction of what may be desired of a common nail having a shank of the rated diameter involved.

SUMMARY OF INVENTION

In the present invention, the nail embodying the invention is characterized by having a flat head that is edge flattened along equal parallel lines spaced a distance twice the diameter of the nail shank. Such nails not only serve as a standard nail in conventional ways with conventional equipment but further fosters a shape and clip arrangement for power nailers in which utmost space economy is attained in a clip of large head area nails. The shanks are contiguous and the heads are arranged alternately contiguous for extensive contact engagement and the nails contact at opposite ends for clip stability. The nails can be fed by hand, by gravity or by spring. Also, the nails are easily handled because they will not roll on a flat surface and can be collated in either one of two orientations by flat edge portions on radially opposite sides of the rim of the head.

The flat edge portions are radially spaced in each nail a distance twice the diameter of the nail shank so that the shanks of two rectilineal rows of nail heads contact at points adjacent to their pointed ends, and alternate heads contact at the nail head ends whereby clip stability is improved by each intermediate nail engaging two nails on each side. Each end nail of a clip extends at its head beyond the next adjacent nail far enough to be nipped from the nail assembly by the powered driver regardless of which side the head is on of the double row of centrally interdigitating transversely contiguous heads.

Moreover, in the feeding of nails progressively into the driver striking position the driver of the power unit can serve as a feed stop in a low retracted resting position during idle conditions, or, if the driver is raised to a poised resting position above the head of the lead nail a feed stop is preferably employed on each side of the path of the driver below the end of the driver to locate the nail in its drive position. The driver then operates to nip or strip and drive the lead nail. When struck by the driver the head and shank of the nail are both cammed into substantial alignment with the driver. The head is cammed by a fixed cam and the nail point is cammed by a resilient finger or fingers at the feed end of the clip, the fingers yielding to the downward passage of the nail head, yet clearing the driver so that it can strike the nail with one blow or transmit plural blows if the driver is repeatedly struck by a repeating hammer.

Where nails are fed pneumatically by a tube each nail head on its driven movement preferably passes through a throat cross-sectionally shaped to mate with the shape of the nail head which helically turns the nail shank during its initial penetration of the nailed material for easing the penetration without damage to the workpiece or to the holding strength of the nail. If the nail is a threaded nail, the helical lead starts the threading rotation with a thread lead equalling that of the nail, preferably approximately 65°.

The nails also are particularly easy to collate into compact strips. Although this can be accomplished with two moving converging lines of nails, with the heads oriented flat-to-flat and the shanks depending, it is preferred to utilize a single line of nails arranged with the flat edges aligned in parallel planes. The line is advanced lengthwise to a station where the lead nails are pushed laterally in pairs to form a double row with head edges flat-to-flat and the shanks are positively displaced to interdigitate. Thereupon the next step can be either to apply a quick drying frangible mastic to the contact lines of the heads and the interdigitating shanks, or, the assembly with or without any mastic securement of the nails, can be fed into a V-shaped sheet metal clip that centers the nail points and carries the weight of nails along two outside facing channels that engage the outside edge portions of the contacting heads.

Preferably, for ease in using the clip, the clip is longitudinally open along the top and an L-shaped spring drawn pusher carried by the power unit is manually drawn out the length of the clip and lodged against the head of the outermost end nail to feed the nails towards the drive station.

Objects of the invention are to provide an improved common or threaded nail which lends itself to economical packaging and use in power nailers; which enables a power controlled twisting of the nail as it enters the workpiece, or, as it comes to rest in the workpiece; whose head can interlock with the workpiece when deeply set; and which is easy to collate compactly in a nail feed or shipping package.

A further object is to provide a nail shape that is easy to form and readily identified in place as to source and physical characteristics including the size of the shank embedded in a workpiece.

The invention also contemplates an improved collating apparatus and process for compactly packaging common nails in a storable feed unit for power nailers.

Another object of the invention is to provide a flat headed nail of approximately a 12 gauge size that has over a third greater holding strength of a comparable shaped 11 gauge nail bright.

Other and further objects and advantages will appear from the following description and claims relating to the drawing in which:

FIG. 1 is a side elevation of a nail gun embodying and utilizing the invention;

FIGS. 2 and 3 are sectional views taken on lines 2—2 and 3—3 respectively in FIG. 1;

FIG. 4 is an enlarged perspective view of a portion of the sectional view of FIG. 3;

FIG. 7 is a diagrammatic top plan view of a conventional collating drum in which the collated nails move radially from the collation discharge opening;

FIG. 8 is an enlarged top plan view partly in section of the formation of collated nails into clips for use with the gun;

FIGS. 9, 10 and 11 are schematic illustrations of the steps taken forming a double line of interdigitated nails from a single line orientation;

FIG. 12 is a diagrammatic vertical section through the oscillating and reciprocating mechanism shown in FIGS. 9, 10 and 11;

FIG. 13 is an enlarged sectional view taken on line 13—13 in FIG. 8;

FIG. 14 is a close-up perspective, partly in section illustrating the nose portion of the gun for feeding and driving nails from a clip;

FIG. 15 is a sectional view taken on line 15—15 of FIG. 14;

FIG. 16 is a sectional view similar to FIG. 15 showing the cooperating locations of the nails and driven for nipping and driving a lead nail each time;

FIG. 17 is a vertical sectional view of the driving barrel with the lead nail nipped and being guided into full drive position;

FIG. 18 is a perspective view of a threaded nail head rotation being driven into a wooden workpiece;

FIG. 19 is a perspective view similar to FIG. 18 showing the nail head recessed and interlocking with the wood fibers;

FIG. 20 is a section taken on line 20—20 of FIG. 19;

FIG. 21 is a perspective end view of the nail feed clip as related to the nails and the resilient nail feeder;

FIG. 22 is an enlarged sectional view through the clip and the gun support magazine for the clip;

FIG. 23 is a dimensioned perspective view of a nail embodying the invention whose shank is grit-blasted;

FIG. 24 is an enlarged sectional view taken on line 24—24 of FIG. 23 illustrating the surface derived from grit-blasting;

FIG. 25 is a perspective view similar to FIG. 23 showing a threaded nail with a grit-blasted shank;

FIG. 26 is a side elevation of a stick of nails in which the nails are held together by frangible mastic;

Figure 5:
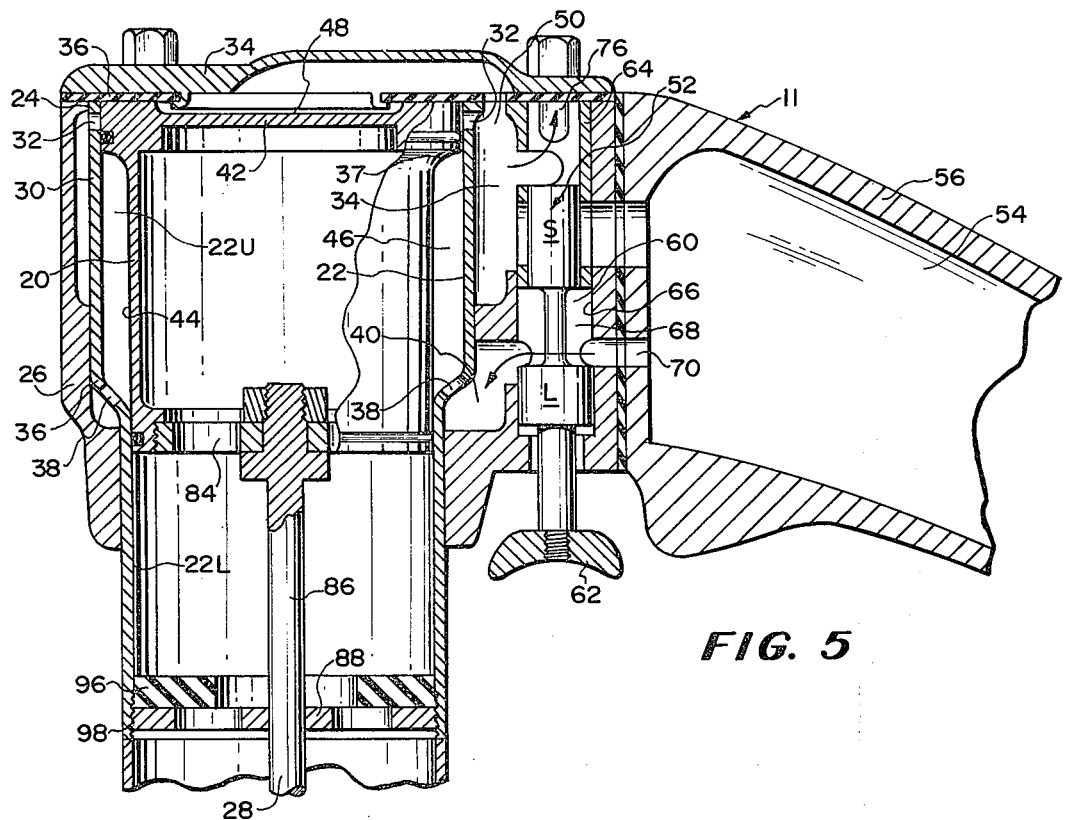
FIG. 5 is an enlarged sectional view taken on line 5—5 of FIG. 3 with the working parts poised for operation.

FIGS. 27 and 28 are top and bottom views taken on lines 27—27 and 28—28 respectively in FIG. 26;

FIG. 29 is a perspective view of a clip end cap carrying a nail shank spacing rod.

NAIL

Referring to the drawings, the nails 10 illustrating the invention can be classified as common, flat-headed, 12 gauge tempered wire nails having the usual dimensions for making pallets. They have flat heads 12 and shanks 18. The numerals without a suffix are used generically while suffixes $r$ (FIG. 23) or $t$ (FIG. 25) indicate the round or threaded character of the shanks, respectively.

The rated diameter $D$ of the heads 12 are substantially more than twice the diameter $d$ of the shanks 18, thus $D > 2d$. Furthermore, the heads 12 are flattened at their edges 14 as at 16 along equal, parallel planes or lines, spaced $f$—$f$ a distance that is twice the diameter $d$ of the shanks, thus $f$—$f = 2d$ for reasons later explained.

Preferably, the flattening at 16 is accomplished by radially directed compression or swaging dies which work the metal, increase the axial width of the resulting faces 16 and thereby provides flat surfaces that engage one another as between collated nails in a stabilizing relationship by substantial engaging surfaces which permit appreciable relative movement without overlapping when being collated and stored, or used loosely.

Also, preferably, the shanks, whether threaded or not, are grit-blasted as indicated at GB with size 80 aluminum oxide grit to remove the "bright" surface of the nail and provide small pits 21 with minute sharply shaped walls. This is particularly true with tempered nail shanks. With this inexpensive treatment two inches of the shank of a 65° threaded 12 gauge nail thus treated provides a holding strength against withdrawal that is substantially greater that a like nail shank sandblasted with the same size conventional sand particles. Such is also much greater than a conventional 11 gauge nail and much greater than with any 12 or 11 gauge coated nail tested. The harder the grit and the smaller the grain size above 40, namely, 70 to 90, 80 is optimum, the greater the holding power of the nail and the more important become the advantages that it is capable of collation in a dispensing clip without the expense, necessity or waste of coatings and adhering material on the shanks.

By way of example, with respect to helically threaded pallet nails actual exploratory holding strength tests have shown the following results with nails identified as follows:

| Nail identification | Length In. | Wire diameter In. | Threaded body outside diameter In. | Head diameter In. | Length of diamond point In. | Number of flutes | Thread angle Degrees | Withdrawal load | | |
|---|---|---|---|---|---|---|---|---|---|---|
| | | | | | | | | Minimum Lb. | Maximum Lb. | Average |
| 2 1/2×11 No coat | 2-17/32 | 0.121 | 0.133 | 9/32 | 5/32 | 4 | 64 | 290 | 340 | 315 |
| 2 1/2×11 TN25° No coat | 2-1/2 | .121 | .127 | 9/32 | 5/32 | 5 | 65 | 305 | 340 | 320 |
| 2 1/2×12 25° T No coat Sand | 2-9/16 | .106 | .119 | 1/4 | 1/8 | 4 | 63 | 325 | 410 | 355 |
| 2 1/2×12 25° Coated | 2-17/32 | .105 | .123 | 1/4 | 1/8 | 4 | 63 | 270 | 360 | 330 |
| 2 1/2×12 25° Grit | 2-9/16 | .105 | .124 | 1/4 | 1/8 | 5 | 67 | 355 | 465 | 390 |

Tentative conclusions:
1.) 2½" x 12 nails have greater holding strength (HS) than 2½" x 11 nails.
2.) 2½" x 12 nails, not coated, have holding strength greater than coated nails.
3.) 2½" x 12 grit-blasted nails (size 80 grit) have the greatest holding strength.
4.) The minimum HS of grit-blasted shanks is approximately equal to maximum HS of coated nails.

Moreover, during withdrawal it was noticed that the high holding strength persists, and renailing in the same nail hole retains approximately the same high holding strength.

In some respects I am not able to account fully for these improved and unexpected results which are obtained by the invention described, and it should be understood that any attempt to analyze the theory which is believed to be responsible for these results is to be construed not as defining a mode of operation, but merely as a possible explanation of certain physical phenomena which have been observed.

Wood fiber displacement is involved in both axial directions of nail movement and, if not split, reamed or torn, their resiliency has maximum resistance up to the point just before splitting occurs. Under these conditions they provide a firm reaction which can be referred to as a heavy clamping frictional contact that is maintained substantially high and constant. Also, the wood fibers at any transversely severed ends can be bent, displaced or end compacted at the nail interface without a tearing action as part of the clamping action.

It also appears that sand-blasting or grit-blasting with large size grit flattens or slicks the nail shank surface, particularly if the metal is untempered, whereas the small hard grit "pits" the surface, which the small size sand does not, with many minute upstanding edges that augment the friction without tearing the wood fibers, going in or coming out, particularly with a 12 gauge size nail which is of a size that does not split the wood fibers.

Fixed protrusions provided sometimes on axially driven wood nail shanks operate to "oversize" or "ream" the wood fibers at the interface. This constitutes damage to the wood fibers, and very little frictional engagement remains. Moreover, the fibers broken in one direction will yield more readily in the other direction and once withdrawal begins, even slightly, any holding strength drops rapidly. Renailing in whole or in part in the same hole under these conditions entails a false expectancy of reestablishing the original holding strength.

NAIL GUN, Shape

In driving the nail 10 GB embodying the invention it may be noted that a heavier driving force proportional to the nail's increased holding strength is required.

Preferably, for high speed nailing, the nails are pneumatically fed singly by tube directly from storage, otherwise either from a collator or clip, to the driving compartment 101 (FIG. 3) of a pneumatic gun 15 (FIG. 1).

Also, in absence of special applications it is highly desirable that a nail 10 of the invention, rated as a common nail, be disposed axially in its driving direction 13 (FIG. 23), and be advanced laterally in a direction 17 (FIGS. 23 and 25) oriented normal to the axis of movement 13 of the nail so that a magazine 19 (FIG. 4) can be arranged to provide a support squaring the drive direction normal to the nailing surface. Furthermore, the magazine itself should be narrow enough that the gun can be inclined laterally to the vertical to toe-nail in narrow spaces. This is distinguished from conventional nailers handling loose common nails or nails fed by magazine in an inclined direction which require auxiliary attachments, or fed from reel housings that are too wide horizontally to permit inclining the gun to toe-nail with common nails.

Accordingly, as noted in FIG. 1, the magazine is at a right angle to the power drive housing 26, the lower edge permits lateral leaning for toenailing, and the nailer is compacted also vertically for a low handle that is manipulated quite easily.

NAIL GUN CONSTRUCTION

As already noted the nails embodying the invention illustrated in FIG. 23 comprise a construction in which their flat heads 12 have two flat edges 16 of equal length defining for each nail 10 two parallel planes 16 of substantial area-of-contact on opposite sides of the shank 18 and spaced apart a distance equal to twice the diameter of the nail shanks. $(f-f=2d)$.

Briefly, the versatility of the present invention for nailing is illustrated with a pneumatic gun 11 shown generally in FIGS. 1–6 having a piston 20 and cylinder arrangement 22 received in the front portion of a body housing 26 for relative vertical movement in reciprocating a driver 28. A liner 30, castellated or apertured, around its upper end 24 to provide ports 32, is mounted in the housing for durability and ease of manufacturing, and the housing 26 is radially enlarged therearound to provide a large flow passage 34 for the ports 32. Part way down its length the liner 30 is provided with a reduced diameter as at shoulder 36, and ports 38 are provided therethrough by which the periphery of the upper cylinder 22 is connected to a valve through passage 40 for alternately venting and applying pressure thereto.

The piston 20 is reciprocably mounted in the cylinder 22 and has an axially predetermined thin head portion 42 at the top received in the larger upper cylinder portion 22U where it marginally closes the castellate ports 32 in its uppermost position as limited by a cylinder head 34 removably bolted thereon and carrying a resilient bumper 36 which serves also as a sealing means for the housing and the piston. The remaining major length of the piston is reduced in size as at 44 to slide in the reduced lower cylinder portion 22L in sealing relationship below the shoulder 37. The shoulder provides an offset to define with the overhang of the head portion 42 a secondary cylinder 46 to power the return stroke of the piston. Thus the cylinders and pistons for the work and return strokes compactly overlap and therby minimize the overall height of the gun.

A recess 48 in the piston head 42 had access to a passage 50 leading through the cylinder head 34 to a high flow capacity spool valve 52 to control fluid pressure that initiates downward movement of the piston. An appreciable downward movement of the piston would nip the lead nail and open the ports 32 rapidly for a full thrust of the piston without any waste of power occurring with any parts first moving in an opposite direction. All air pressure is effective in a downward direction against the piston with all spaces below the piston head 42 vented to atmosphere.

Air pressure is taken from a large collection chamber 54 in the handle 56 supplied by an air hose 57 and is controlled by the spool valve 52 which handles large volumes of air under pressure quickly through a large flow area 60 located between the spool valve heads S and L that are vented to atmosphere at opposite ends. The valve may be finger actuated by trigger 62 with minimal effort since a slight pressure differential on the heads that is provided by relative diameters of the spool heads S and L establishes a continuous differential force normally urging the valve to a "closed" position. For this purpose the valve has a sleeve liner 64 for the spool valve which is open to atmosphere at its upper end and provides a step up size at the lower end to a diameter at 66 that provides a larger diameter cylinder portion 68 and valve head L whereby air pressure which is continuous in the piston chamber 60 between the differential valve heads S and L continuously urges the larger area valve piston L downwardly to a closed position.

Figure 6:
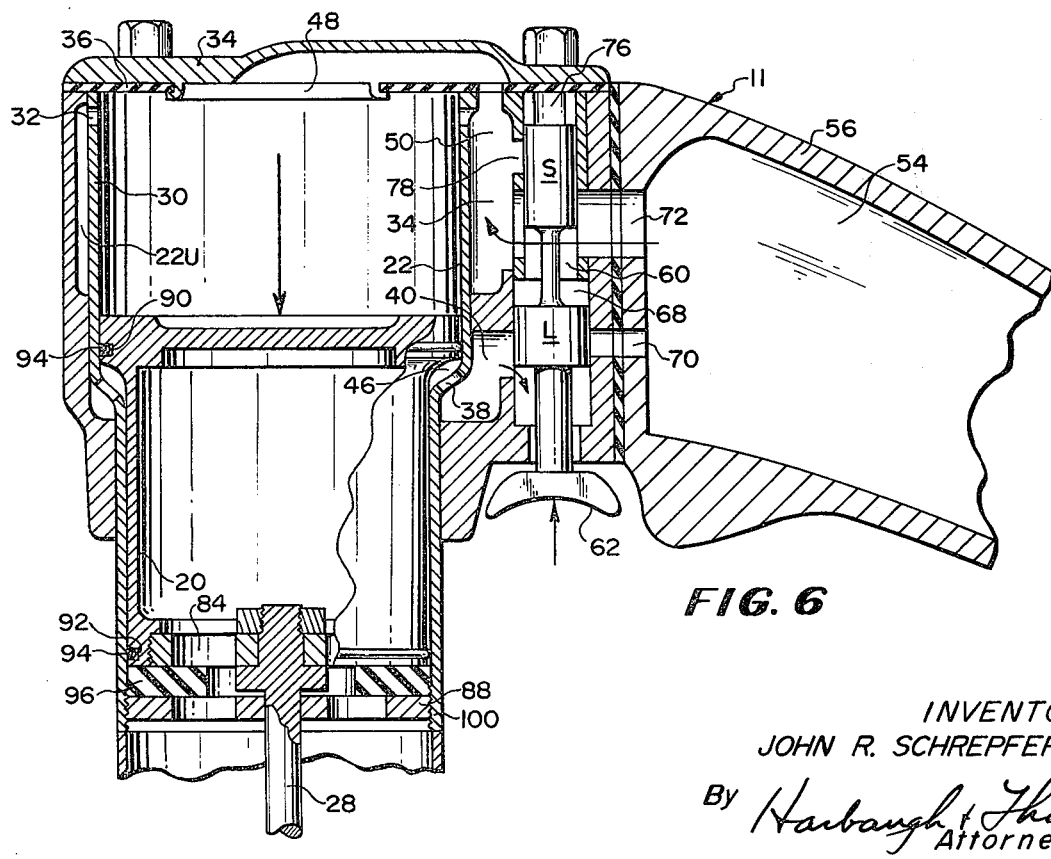
FIG. 6 is a view like FIG. 5 showing the working parts in their operated, nail-driven position.

In its "closed" position shown in FIG. 6, pressure from the handle chamber 54 enters through passage 70 and passes through the valve chamber 60, through passage 40 and through openings 38 into cylinder 46 to hold the drive piston 20 in its poised or retracted position with minimum use of compressed air volume. When triggered against the mild valve closing pressure (FIG. 6), the lower head L is moved upwardly to vent the return chamber 46 through openings 38 and passage 40 while the spool chamber 60 advances to interconnect the passages 72 and 50 to apply driving pressure to the space 48 while the upper head S closes the vent passage 76 from the space 34. The piston is driven downwardly. Then when the trigger 62 is released, the pressure present in the spool chamber 60 dominates the valve by acting against the larger spool head L exposed to atmosphere on the other side and drives the spool valve downwardly venting the drive chamber 22 to atmosphere through the port 78 and the laterally extending exhaust passage 76 for a controlled return of the piston to its poised position against bumper 36.

Preferably, as viewed in FIG. 1, for the sake of gun compactness, the closeness of the operators hand to the axis of the nail driver and to the nailing surface for improved manipulation of the gun it will be observed the spool valve thereby forms part of the handle, or is present in the handle.

The piston 20 is lightly but ruggedly constructed to reduce its inertia and rely essentially upon the air pressure to drive the nails. The driver is the rod 28, has a shoulder flange 83 that extends through a spider 84, and is terminally threaded for nut 85 or welded to the spider to transmit the driving force of air pressure on the piston through the spider to the head of a nail. A spider 88 centers and guides the intermediate portion 86 of the driver 28 with respect to the smaller cylindrical surface 22L. Grooves 90 and 92 are provided around the head and spider 84 to receive suitable O-ring seals 94 lubricated by lubricant conventionally supplied to the air pressure supply line.

The depth to which a nail is driven is adjustably determined by a resilient bumper 96 adjustably supported at the lower end of the power cylinder as at 98 by a threaded relationship of the spider 88 at 100.

In operation, the driver 28 on the initial movement of the piston on its driving stroke nips the lead nail (FIGS. 16 and 17) to move it towards its drive position and by this movement the ports 72 and 32 are opened for a strong, quick and full driving thrust with the compressed air entering through all driving ports 32 while the air present in the peripheral cylinder space 44 below the piston head is vented to atmosphere. Thereafter the piston is returned to its starting position upon release of the valve by air pressure being admitted to the differential area 46 under the piston head 42 while air pressure is vented from above the piston through the exhaust 76. This is accomplished without undue bounce of the gun in the hand of the operator as the piston closes the ports 32 and contacts the combination head seal and bumper 36.

NAIL DRIVING

In the driving compartment or barrel 101 (FIG. 17) the driver 28 attached to the piston 26 travels a predetermined axial path. On the opposite sides of this path nail head engaging stops 102 are provided on the wall of the barrel against which the exposed flat portion 16 of the head 12 of the lead nail 10a of a lateral feed clip 21 is contacted at a point where the driver overhangs a substantial portion of the head without touching the secondmost nail head 10b. The stops 102 (FIG. 15) are contoured as at 104 to follow the round portion of the nail heads 12 laterally of the axial path of the driver. Below the initial contact level at 106, the contours 104 are arranged to define converging cam chutes 105 that alternately move the lead nail heads to a position coaxial with the driver within the distance of approximately three diameters of the nail head. This is done with an initial rapid radial displacement which occurs at the initial slower movement of the accelerating driver 28. The nail points are also cammed inwardly at 108 to pass through centering spring fingers 110 that accept the head of the nail as it is driven from the driving barrel.

Where the nails 10 are supplied one-by-one by a pneumatic tube (not shown) the nails are delivered endwise to the driving chamber through the same end receiving the driver. As each nail settles into place in the chamber, its head rotatively orients itself to the contour thereof that mates with the shape of the head. Thereafter as the nail is moved through the barrel the nail is rotated by the mating contour that is spiralled at an angle of 65° corresponding with the lead of a threaded nail 10t. Thus whether threaded or not the nail enters the wood with a turning action that assists in avoiding a splitting of the wood fibers so that the greatest possible holding strength is provided for both smooth and threaded nail shanks.

It is to be noted (FIGS. 19 and 20) that when threaded nails 10t embodying the invention are dispensed and the heads are counter sunk into the wood fibers 112 of a workpiece 111, the head 12 will take a twist in the wood fibers 112 below the surface 114 thereof and provide a locking relation as at 116 with wood fibers located between it and the surface through which it was driven. This provides a desirable keying action.

Any frangible adhesive that may be used on the heads to secure the collated nails together as a stick will be sufficiently shattered by the driver that the remains will easily fall out of the barrel for a clean drive that establishes great holding strength.

NAIL COLLATION

For purposes of rapidly collating the nails for gun use a conventional rotating hopper 122 is provided rotated an axis inclined to the vertical. The nails are dropped in a trough having a slot in the bottom where the shanks of nails drop through to be supported by their heads and move outwardly on parallel rail channel members 124 defining tracks 126. The tracks are subject to vibration longitudinally and are slightly inclined for the nails to slide away from the drum. As the nails enter the tracks, they slide below flanges 125 overhanging the nail heads to hold the heads marginally in a fixed plane and provide convergence of the sides 128 to contact the edges of the nail heads loosely. Adjacent the hopper the sides 128 are spaced the distance D and converge to the distance $f-f$ (FIG. 8). One of the sides 128A is independently mounted as a slider by headed pins 127 in slots 129 and oscillated longitudinally against spring 121 by a lever 131 pivoted at 133 engaging the slider 128A at one end and actuated at the other end by a roller 135 engaged by gear teeth 137 on wheel 139. The slider 128A has a counter current shoulder 123 that engages the advancing nail heads at their major dimension to agitate and turn them until they turn enough for the flat edges 16 to pass between the converged side guides to dispose the flat edges in alignment and carry them in that alignment to a collection station where an advancing means 136 is provided to move the nails laterally two-by-two into a final collation assembly line. For this purpose, as illustrated in FIG. 12, each successive pair of adjacent nails are engaged by followers 136 driven by cams 138 on the wheel 139. Follower 136H has offset shoulders spaced the distance d of the nail shank diameter that engage the flat edges 16 to offset them that distance and push them into the clip form shown in FIG. 13. The follower 136S is synchronized by the cams 138H and 138S as shown in FIGS. 9, 10 and 11 to engage the shanks of each pair of nails after they are offset and has a V-shape 141 to bring the points of the nails into overlapping interdigitating relation at the nail points.

Thus the collation provides shank and head contacts for each nail which are offset horizontally whereby the lead nail of the pair is pushed off ahead of the companion nail a distance equal to $d$ with a stroke distance of at least $2d$. As so moved, the points of the shanks are cammed by a V-form 141 to overlap in contact with each other in interdigitating relation in the final assembly.

In this relation, the nails move along either to receive a frangible mastic adhesive 120 covering the overlapping inner portions of the heads (not shown) or the points as applied by rollers 143 (FIG. 13), or both, in mutually supporting relationship, or they are fed into or picked up in clips of the shape and form shown in FIGS. 1 and 2, for shipment and use in a gun magazine of like shape.

NAIL CLIPS

Clips of nails collated in two rows of alternating heads and interdigitated shanks as shown and described are particularly durable. Any group of five nails, as may be marked by A, B, C, D and E for explanation purposes, present unusual geometrically strong arrangements in which three heads A, B and E are each in contact with both of the other two; any one head E is contacted by the other four heads A, B, C and D; and, their shanks form a line of contacting shanks. Thereby each nail of any three nails contact an adjacent nail at least at two spaced points of its length for bilateral support and the strength of the group, and, each group of five has at least seven head contacts and four shank contacts for stability. Moreover, the contact points of the shanks can reasonably be located anywhere within the lower half of the shanks, preferably near the point as at 118 whereby three-point support for each nail is provided for position strength in the clip and with minimum use of adhesive in a stick, if used.

If an adhesive means 120 is employed to provide nail "sticks," it can be a narrow strip along either side or both, of the nail shanks where they contact as at 118, and along the wave-like interstice occurring centrally between the two rows of heads as indicated at 122. Whenever it is used quantities required are small and such is shed when the nail is driven into the wood.

In both instances, the lines of contacts are normal to the nails as thus oriented and collated. For that reason they are mutually well supported. Furthermore, with both columns of loose nails or any sticks of adhered nails they can be fed horizontally to the driving chamber of the gun as supported in a gun magazine that in turn squares the nails to the plane of the work surface.

Any clip-like means 21 that supports a group of nails thus collated may be molded or fashioned of any suitable material such as metal or plastic to define at least two facing channels 124 to support the heads and preferably a stabilizing channel 126 for the nail points. As shown, the clip comprises two parallel channels forming lower rails 128 externally and upper walls 130 but inwardly opening towards each other to receive the opposite edges 132 of the collated nail heads and confine them to longitudinal movement therein. The two channels 124 preferably constitute formed edges of a sheet that is substantially V-shaped having sides 119 to protect the nails against lateral blows and strains during handling and also in the gun or during shipping. The angle of the V-shape sides holds the points of the collated nail heads against the nail heads being cocked or slipping into overlapping relationship.

The clip can be bi-terminal for receiving and discharging the nails through either end. For this purpose both ends are cross-apertured as at 145 (FIG. 21)

through the sides 119 to receive a nail or bent wire 147 therethrough at one or both ends. Preferably, however, at one end a cap 149 is provided (FIG. 29) which has its side flanges 151 dimpled at 153 to snap in the holes 145 and carries a rod-like spacer 155 (FIGS. 22 and 29) that runs the length of the clip 21 in position to engage the nail shanks and hold the heads in place in channels 124 against possible violent handling.

NAIL FEED in NAIL GUN

Forward feed of the nails to the driving position is accomplished by a manually adjusted follower 140 (FIG. 21) engaging the rearmost nail 10c in the clip for resiliently advancing the nails as a group.

For receiving a clip or stick to feed nails to their drive position, the gun is provided with an elongated chute or receiver 140 opening into the barrel 101 and the receiver is provided with parallel facing channels 157 that receive the rails 142 of the clip 21 in guided relationship. Also inwardly thereof the receiver has shoulder lands 144 (FIG. 22) that engage the heads of the nails as at 146 in a slidably guided relationship along the top. This relation enables either the use of the clip 21 throughout the driving of the nails therein, or, the clip can be inserted to locate the nails in place, even though loosely collated, and the clip when withdrawn leaving the nails in feed position in the chute 140.

In either event, for resiliently advancing the nails by the follower 140, a slot 148 is provided longitudinally in the top wall of the receiver between the shoulder lands 144 to receive a flexible band or cable 150 that is attached at one end to a spring rotated wind-up drum assembly 152 (FIG. 14) carried by the gun. At the other end the cable 150 is secured to an ear 158 on the follower 140. The follower and cable are releasably received in the slot 148 in guided relation to engage the rear edges of the tail-end nail heads in the magazine, as at 152. For this purpose the follower 140 is constructed to clear the upper edge of the cap and operate as a miniature walking beam having cross-arms 154 with their forward faces engaging the flat portions on the rearmost nail heads at approximately a spaced distance coincident with the transverse spacing of the two rows of shanks.

A handle 156 is carried by the follower 140 for manipulation thereof and extends through the slot 148 and laterally for finger engagement so that the follower can be backed out of the slot and reinserted each time the magazine is replenished with collated nails. Furthermore, although the lower outside edge of the magazine can have any exterior design treatment desired, as at 158, for work engagement, the inside is conformed to guide the collated nail points, thereby making it possible to use a very thin metal or plastic clip for the nails, which are easily filled, emptied, or, serve only as a one-time or repeat use package.

When replenishing the receiver, the follower 140 can be temporarily supported out of line with the receiver oening to free one of the hands of the operator for replenishing the receiver. Also the handle tracks the nail supply and serves as a visual indicator of the number of nails remaining in the magazine.

Although cohesives can be dispensed with in order to save time, money and eliminate waste, yet the description will indicate how frangible cohesives 118 can be employed to make nail "sticks," if desired. However, coatings, adhesives and surface etching cannot equal the holding power of the 12 gauge nail described, but rather detract from it. It is for that reason that the nails embodying the invention are preferably handled without any adhesives on the shanks and adhesives that may be used on the heads will break free on spiral nails so that embedding the head locks it in wood fibers as noted.

What is claimed is:
1. A full headed nail comprising,
a shank member and a flat head member,
said head member having a peripheral edge defining a pair of arcuate sections disposed at opposite ends of a major diametrical axis and a pair of parallel segmented portions of equal length disposed at opposite ends of a minor diametrical axis,
the length of said major diametrical axis being substantially greater than twice the diameter of said shank member,
the length of said minor diametrical axis being substantially equal to twice the effective diameter of said shank member,
the major portion of its shank being surface finished with minute pits having small sharply shaped walls as produced with grit-blasting the shank with No. 80 grain size aluminum oxide grit to frictionally engage wood fibers without tearing them when passing laterally therethrough.
2. The nail defined in claim 1 in which the shank is threaded with a helix angle of approximately 65°.
3. The nail defined in claim 1 in which said sharply shaped walls provide high frictional contact with wood fibers in spiral paths without tearing the wood fibers.
4. The nail defined in claim 1 in which said shank member is threaded with a long lead to receive wood fibers past said head at said segmented portions and rotate said arcuate sections of said head laterally into said wood fibers on opposite sides of said shank when the head is driven below the surface of a wooden workpiece.
5. The nail defined in claim 1 in which the head has equal holding areas on opposite sides of any diametrical line through said head normal to the central axis of said shank.

* * * * *